Aug. 27, 1957  G. S. GARCIA-GALIANO  2,803,921
DRIVING MECHANISM FOR INTERCONNECTED WHEELED BODIES
Filed Aug. 30, 1955  2 Sheets-Sheet 1
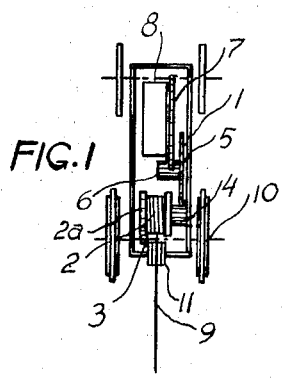
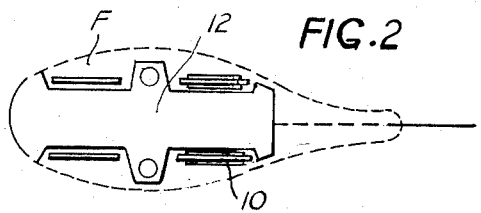
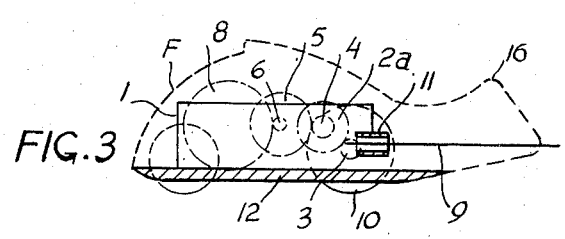
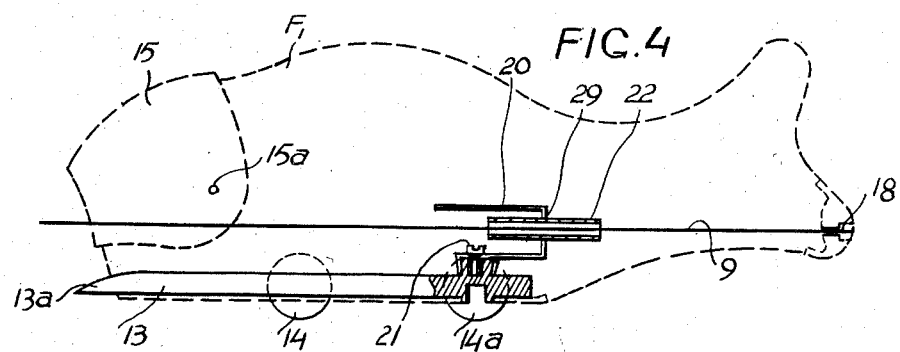
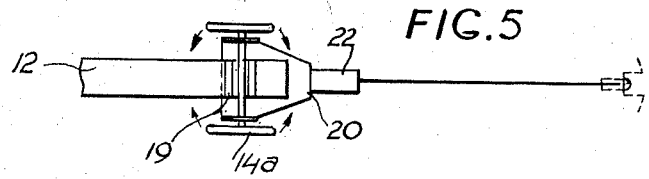
INVENTOR.
Gregorio Sanchez Garcia-Galiano
BY A. John Michel
ATTORNEY Aug. 27, 1957  G. S. GARCIA-GALIANO  2,803,921
DRIVING MECHANISM FOR INTERCONNECTED WHEELED BODIES
Filed Aug. 30, 1955  2 Sheets-Sheet 2
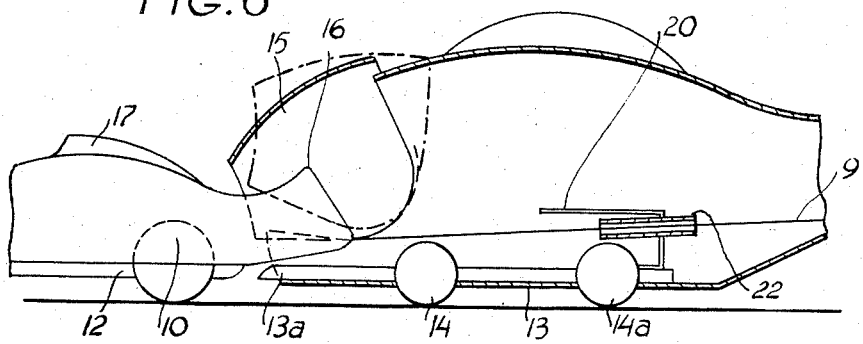
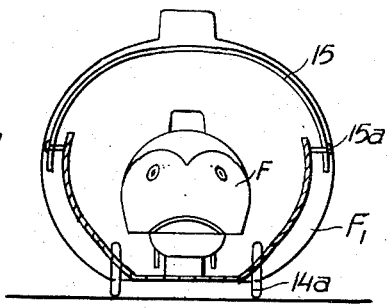
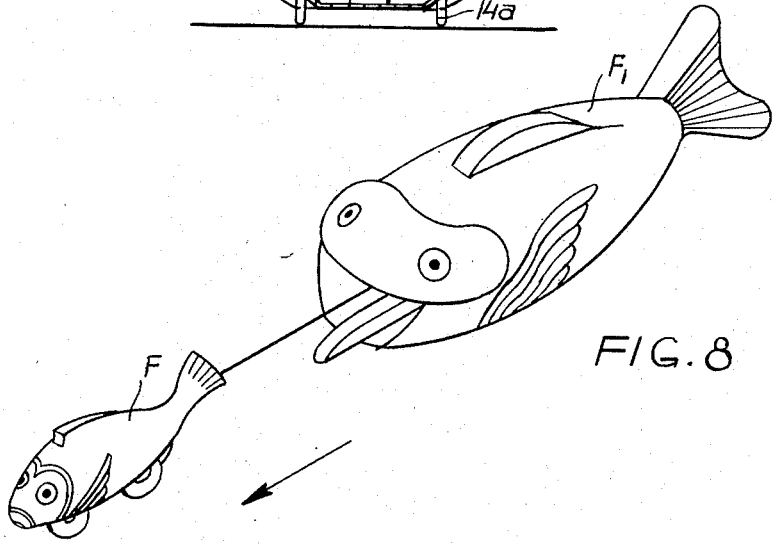
INVENTOR.
Gregorio Sanchez Garcia-Galiano
BY A. John Michel
ATTORNEY ature 27, 1957

United States Patent Office 2,803,921
Patented Aug. 27, 1957

2,803,921

DRIVING MECHANISM FOR INTERCONNECTED WHEELED BODIES

Gregorio Sanchez Garcia-Galiano, Madrid, Spain, assignor to Rico S. A., Alicante, Spain, a corporation of Spain Application August 30, 1955, Serial No. 531,351

Claims priority, application Spain April 23, 1955

6 Claims. (Cl. 46—103)

The present invention relates to mechanism for actuating the movement of interconnected wheeled bodies, and more particularly to such actuating mechanism which provides relative motion between the bodies while driving the same forwardly.

Essentially, the invention provides a driving mechanism mounted in a wheeled body, and cable means interconnecting said wheeled body with a driven wheeled body, the driving mechanism comprising a gear train including a spool for winding the cable and a helical spring for setting the gear in motion, the spring being tensioned by unwinding of the cable, thus setting the gear and the wheeled bodies into motion, and the gear elements being so proportioned that the cable is wound onto the spool faster than the first-named wheeled body moves, thereby pulling the second-named wheeled body closer to the first-named body as both bodies are moved forwardly.

If desired, the second-named or driven wheeled body may be so proportioned that the first-named body may enter it through an opening, means being provided to facilitate the entry of the first-named body thereinto as the two bodies are being pulled together during their forward movement.

The invention will be described in detail and illustrated in connection with two simulated fish mounted on wheels but it is to be clearly understood that any two wheeled bodies may be interconnected and driven by the driving mechanism of the present invention which is in no way limited by the nature of the specific configuration of the wheeled bodies. In the drawing, Fig. 1 is a schematic top view of the driving mechanism;

Fig. 2 is a bottom view of the driving wheeled body carrying the driving mechanism;

Fig. 3 is a side view of the driving wheeled body, partly in section;

Fig. 4 is a side view, partly in section, of the driven wheeled body;

Fig. 5 is a bottom view of a portion of Fig. 4;

Fig. 6 is a side view of the two bodies at a point of motion when the first body approaches the second one;

Fig. 7 is a front view of the two bodies at rest; and

Fig. 8 is a perspective view of the two bodies in operation.

Referring now to the drawing, wherein like numerals in the various views indicate the same elements, Fig. 1 shows casing 1 housing the reduction gear means providing the drive. The casing may be of metal or any other suitable rigid material. The reduction gear means mounted in casing 1 includes winding spool 2 carrying toothed gear 2a which meshes with pinion 3. Spool 2 is coaxial with pinion 4 rotatably mounted in the casing wall and transmitting motion to gear 5 which is coaxial with pinion 6, gearing 5, 6 also being rotatably mounted in the casing wall. Pinion 6 meshes with gear 7 which carries helical spring 8. Cable or wire 9 is attached at one end to spool 2. When the wire is wound on the spool, the gear train is at rest. When the cable is pulled to unwind it, spool 2 and the remainder of the gear train are rotated and spiral spring 8 is tensioned by rotation of gear 7 in a manner known per se. Upon release of the cable, the tensioned spring is released and thereby sets the gear mechanism in motion, thus winding the cable on the spool. Pinion 3 is coaxially connected with the axle of wheels 10, driving the wheels while spool 2 rotates. Proper positioning of cable 9 is assured by guide channel 11 arranged in the casing wall adjacent spool 2.

The gear casing and wheel assembly is mounted on base plate 12 (see Figs. 2 and 3) forming part of body F which, in embodiment shown, has the form of a fish.

Fig. 4 shows the driven body $F_1$ which, in the embodiment shown, has the form of a fish similar to, but larger than, fish F. This body has no driving mechanism of its own and is propelled by the driving mechanism mounted in body F, as will hereinafter be explained.

Body $F_1$ is so shaped and proportioned that body F may be accommodated therein (see Fig. 7). For purposes of smooth entry of fish F into fish $F_1$, the latter is provided with a jaw portion 15 which is pivoted to the main body at 15a. As shown in Fig. 6 tail portion 16 of fish F is slightly lower than the upper edge of jaw portion 15 and slants backwardly to assure easy entry into the jaw portion. Dorsal fin 17 of fish F is smoothly curved backwardly and will thus gently lift pivoted jaw portion 15 when fish F enters therethrough. Thus, the mouth of the big fish will open automatically upon being contacted by the body of the small fish and will appear to swallow the latter as it moves thereinto. Rail 13 is formed with a downwardly curved tip 13a projecting forwardly of the body. This tip constitutes the lower jaw of the mouth of the big fish and its downwardly curved portion assists in guiding the small fish into the big fish, the upwardly curved rear end of base plate 12 of body F cooperating with the downwardly curved tip portion of rail 13, as seen in Fig. 6.

Cable 9, whose one end is attached to spool 2, has its other end anchored to the tail of body $F_1$ at 18. Body $F_1$ is mounted on freely rotatable front wheels 14 and rear wheels 14a. The rear wheels are journalled in swivel truck 19 which is pivotally mounted at the inner end of rail 13 (see Fig. 5). Angle plate 20 is mounted on the swivel truck by means of bolt 21 and carries guide channel member 22 which holds cable 9. Thus, the driven body $F_1$ will be towed by driving body F and, when the latter advances in an irregular, rather than a straight, course, the driven body will follow in its track, the described swivel mechanism serving as a guide and steering means. In this manner, the two bodies will be in perfect alignment when the smaller body approaches the bigger body, such alignment assuring easy entry of the former into the latter body.

All the friction surfaces of both bodies are free from projections, chamfered and smooth to ensure good sliding engagement therebetween and to avoid any resistance to the approaching movement of the two bodies. Rather, the shape of the rear end of base plate 12 and the front tip of rail 13, as well as the shapes of tail 16, fin 17 and mouth portion 15 will facilitate the relative movement of the two bodies when they are in contact with each other.

As will be obvious from the above description, the apparatus operates as follows:

When the bodies are at rest, the small fish F will be positioned inside the large fish $F_1$, as illustrated in Fig. 7. To operate the apparatus, the small fish is withdrawn through the mouth of the big fish by pulling it out. Since cable 9 is anchored with one of its ends to the tail of the big fish and with its other end to spool 2, this pulling action will rapidly, almost instantaneously, unwind the cable from the spool, rotating the spool and thus entraining the gear mechanism to wind up or tension spring 8.

This tensioning action is almost instantaneous but the spring will run down slowly since its power is proportioned to the gears it drives.

When the two bodies are pulled apart (but still connected by cable 9), they are placed on a flat surface. The spring will begin to unwind, thus rotating the gears and transmitting rotary motion to the spool and wheels 10 of body F. The body F will advance on its wheels, towing body F₁ behind it. Simultaneously, rotation of spool 2 will cause reeling of cable 9, thus shortening the distance between the two bodies and pulling them closer together while both advance. The length of cable 7 is so proportioned that it is wound upon spool 2 before spring 8 has run down completely, i. e. the two bodies are telescoped into one another before the driving mechanism stops.

Essentially, therefore, the action consists of a forward movement of both bodies simultaneously with an approaching movement thereof until the towed body overtakes the towing body and swallows it. Thus, while the driven body has no direct driving mechanism and is moved entirely by the driving body, it moves at a faster pace than the driving body and finally swallows it.

Since the cable is firmly anchored in the driven body, the latter will exert a constant pull on the driving body. The smooth oblique edges of the rocking upper jaw of the large fish and the smooth surfaces of the tail and dorsal fin of the small fish will cooperate in the manner of a wedge, thus pivoting jaw portion 15 upwardly and opening the mouth of the big fish. The cooperating curved ends of base plate 12 and bottom rail 13, on the other hand, will also assist in the sliding movement of the small fish into the big fish. When the small fish is swallowed and moved into the interior of the big fish, the mechanism returns to its state of rest, ready for the next action.

While the invention has been illustrated in connection with fish bodies, it will be readily understood that any desired figures may be substituted therefor, i. e. a mouse and a cat, a rabbit and a dog, etc.

The invention is concerned essentially with a driving mechanism advancing two interconnected bodies while simultaneously moving them relatively to each other. Many variations and modifications in the design of the driving mechanism and/or the bodies may occur to those skilled in the art, particularly after benefiting from the present teaching, without departing from its spirit and scope as defined in the appended claims.

What is claimed is:

1. A mechanism for actuating the movement of two interconnected bodies mounted on wheels comprising, in combination: a driving body, a driving mechanism mounted on said driving body and including a gear train, one of the gear elements being operatively connected to a pair of wheels and said driving body, a spool carried by another one of the gear elements, a helical tension spring mounted on an end gear element of the gear train and arranged to set the gear train in motion upon release of the spring tension, and a cable connected at one end to said spool and adapted to be wound thereon, the spring being tensioned by unwinding of the cable and concomitant rotation of the spool and gear elements; a tubular cable guide means adjacent the spool; and a larger hollow driven body attached at its far end to the other end of said cable which traverses the interior of the hollow body, said driven body having a mouth portion at its forward end through which the driving body may enter and be received within the driven body and said interior being so shaped as to accommodate the driving body, the driven body being driven with and toward the driving body when the cable is wound on the spool and the spring being tensioned when the two bodies are pulled apart and the cable is accordingly unwound.

2. The mechanism of claim 1, comprising a base plate for mounting the driving body, the end of the base plate facing the driven body having an upwardly curved portion and the upper surface of the driving body being backwardly tapered and streamlined.

3. The mechanism of claim 1, comprising a base plate for mounting the driven body, the forward end of said base plate facing the driving body having a downwardly curved portion, a swivel member horizontally pivotably mounted on said base plate adjacent its rear end, a wheel axle mounted on said swivel member for carrying the back wheels of the driven body, and a second tubular guide means mounted on the swivel member, the cable passing through said second guide means.

4. The mechanism of claim 1, comprising a base plate for mounting the driving body, the end of the base plate facing the driven body being upwardly beveled, and a base plate for mounting the driven body, the end of the latter base plate projecting from said body and said end being downwardly beveled, the two beveled ends of the base plates being slidingly engaged upon entry of the driving body into the driven body.

5. The mechanism of claim 1, wherein the mouth portion includes a pivotable jaw portion, the rear portion of the upper surface of the driving body cooperating with said jaw portion to pivot it upwardly upon contact.

6. The mechanism of claim 1, wherein the hollow driven body is provided with a pair of free-running front wheels.

References Cited in the file of this patent

UNITED STATES PATENTS

| | | |
|---|---|---|
| 470,860 | Caulfield | Mar. 15, 1892 |

FOREIGN PATENTS

| | | |
|---|---|---|
| 423,935 | Germany | Jan. 19, 1926 |
| 691,974 | Great Britain | May 27, 1953 |
| 861,525 | Germany | July 27, 1953 |